Jan. 9, 1940.    R. C. PAGE ET AL    2,186,908
AIR FILTERING STOPPER
Filed Feb. 1, 1939
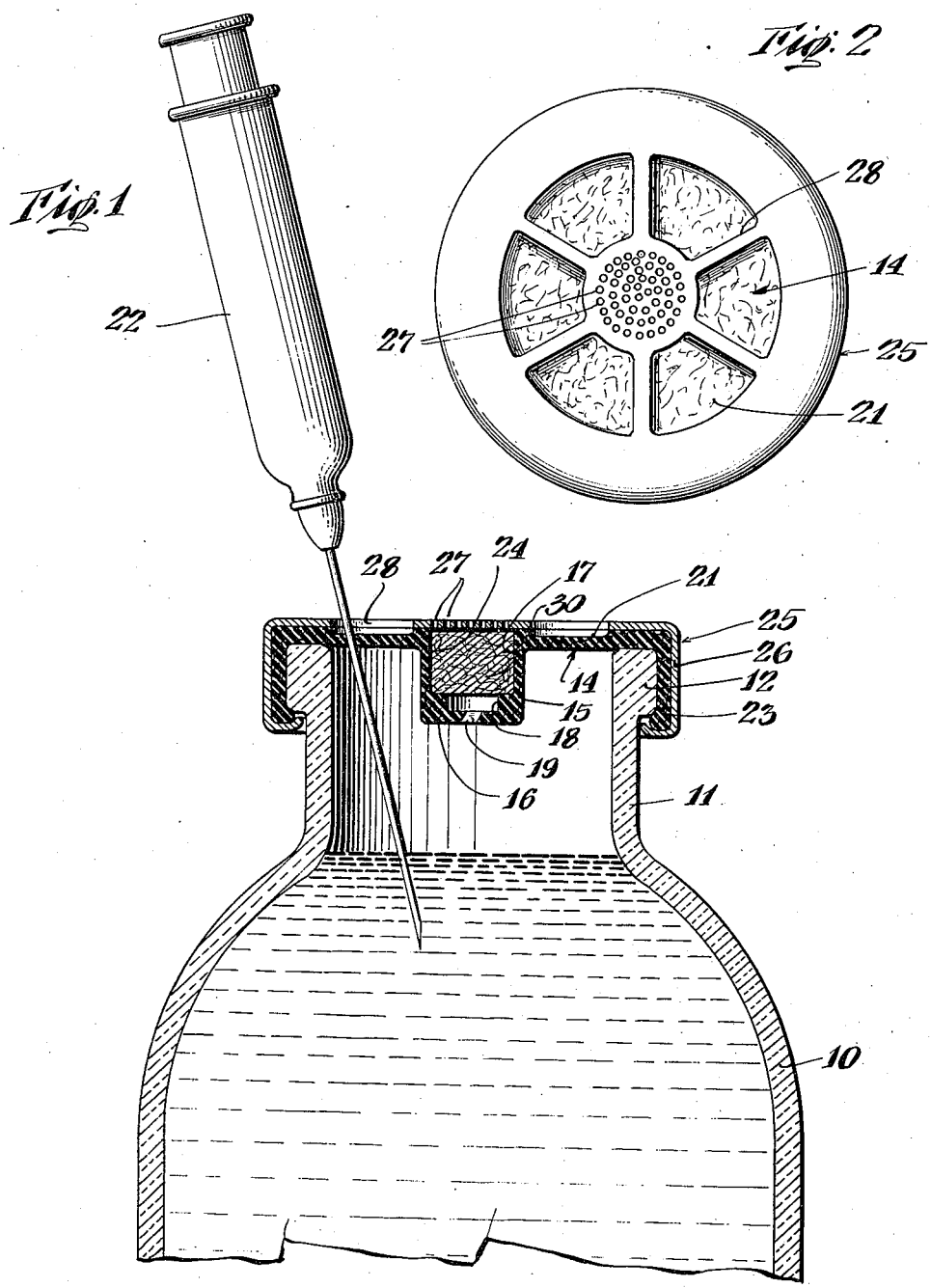
INVENTORS
Robert C. Page
BY Paul E. Tullar
ATTORNEY Patented Jan. 9, 1940

2,186,908

UNITED STATES PATENT OFFICE 2,186,908

AIR FILTERING STOPPER

Robert C. Page, Mount Vernon, and Paul E. Tullar, Tuckahoe, N. Y., assignors to Burroughs Wellcome & Co. (U. S. A.) Inc., New York, N. Y., a corporation of New York Application February 1, 1939, Serial No. 254,044

3 Claims. (Cl. 215—38)

This invention relates to bottle closures and more particularly to an air filtering stopper for use with bottles containing sterile liquids.

An object of the invention is to provide a stopper of the above type which is adapted to permit withdrawal of the sterile liquid by means of a hypodermic needle.

Another object is to provide a stopper of the above type having means to introduce filtered air into the bottle as the liquid is withdrawn by the needle.

Another object is to provide an air filtering stopper having novel and improved details of construction and combinations of parts.

Various other objects and advantages will be apparent as the nature of the invention is more fully disclosed.

Although the novel features which are believed to be characteristic of this invention will be more particularly pointed out in the claims appended hereto, the invention may be better understood by referring to the following description, taken in connection with the accompanying drawing in which a specific embodiment thereof has been set forth for purposes of illustration.

In the drawing:

Fig. 1 is a vertical section through a stopper embodying the present invention and Fig. 2 is a top plan view thereof.

Referring to the drawing more in detail, the invention is shown as applied to a bottle 10 which is adapted to contain sterile liquid, such for example as a liquid to be used in a hypodermic syringe. The bottle 10 is shown as provided with a neck 11 having an external flange 12 formed thereon. The bottle closure constructed in accordance with the present invention, comprises a member 14 made of soft resilient material such as soft rubber or the like, which is easily punctured by a hypodermic needle but which has the property of reclosing when the needle is withdrawn so as to maintain an air tight bottle closure. In the form shown the member 14 comprises a central depending wall 15 and a bottom member 16 forming a filter chamber 17. The bottom member 16 is provided with a raised peripheral flange 18 for the purpose to be described and with a slit 19 formed centrally thereof, the slit constituting an air valve which automatically admits air into the bottle when the air pressure therein is reduced due to the removal of a portion of the contents. The air valve, however, will not permit reverse flow of the contents of the bottle into the filter chamber, inasmuch as ordinarily the pressure within the bottle is equalized with the external air pressure and there is no differential to cause such reverse flow.

The member 14 is also provided with an annular portion 21, surrounding the filter chamber, which is made sufficiently thin to permit easy passage of the hypodermic needle 22 and is provided with an outer flange 23 which is adapted to be bent around and under the flange 12 of the bottle for sealing purposes.

The filter chamber may contain a suitable air filtering and sterilizing medium such as a plug of treated cotton or the like 30, which may be made of a shape to conform to said filter chamber. The filter material rests against the peripheral flange 18 so that an air space 24 is provided above the slit 19. This air space prevents the filter material from pressing against the bottom member 16 adjacent said slit and interfering with the operation of the air valve.

The member 14 may be secured to the bottle by suitable means such as a cap 25 which is preferably formed of rigid material such as metal, and is provided with a flange 26 extending around and beneath the flange 12 of the bottle neck for holding the member 14 permanently in place. The member 25 is shown as provided with a plurality of air vents 27 registering with the filter chamber 17, so as to permit the passage of air therethrough. The air vents 27, however, are made sufficiently small so that the hypodermic needle 22 cannot be accidentally inserted into the filter chamber. The member 25 is also provided with openings 28 disposed over the annular portion 21 of the member 14. These openings are designed for passage of the hypodermic needle and may be of such a size as to insure the passage of the needle through the thin annular portion 21 of the member 14. In the case of a bottle having a small neck, the openings 28 may be spaced from the walls 15 a sufficient amount to prevent the hypodermic needle from accidentally engaging said walls if the same is inserted in an inclined position, or the walls 15 may be conical in form so as to provide more clearance for the needle. In any event, the needle is readily inserted into the openings 28 and as the contents is withdrawn from the bottle 10, filtered air is admitted through the filter chamber and the air valve 19. As soon as the needle 22 is withdrawn, the soft material of the member 14 recloses and the air valve 19 likewise closes to prevent contamination of the liquid or escape thereof.

The invention may also be applied to a screw top bottle by a suitable modification of the flange 26.

Although a specific embodiment of the invention has been shown for purposes of illustration, it is to be understood that the invention is capable of various uses and that changes and modifications may be made therein, as will be readily apparent to a person skilled in the art. Certain specific terms have been used herein merely for convenience of description and not as a limitation on the scope of the invention. The invention is to be limited only in accordance with the following claims.

What is claimed is:

1. A bottle closure comprising a stopper made of soft pliable impervious material adapted to be punctured by a hypodermic needle or the like for withdrawal of the contents of the bottle, said stopper having a filter chamber formed by side and bottom walls of said material and containing a filter material adapted to filter the air passing therethrough, one of said walls having a slit therein constituting an air vent adapted to permit passage of air into said bottle as the contents of the bottle is removed by said needle, said slit being self-closable when the air pressure within the bottle is equalized with the external air pressure, whereby the bottle is completely sealed except when liquid is being withdrawn by said needle.

2. A bottle closure comprising a stopper made of soft pliable impervious material adapted to be punctured by a hypodermic needle or the like for withdrawal of the contents of the bottle, said stopper having a filter chamber formed by side and bottom walls of said material and containing a filter material adapted to filter the air passing therethrough, one of said walls having a slit therein constituting an air vent adapted to permit passage of air into said bottle as the contents of the bottle is removed by said needle and closable when the air pressure within the bottle is equalized with the external air pressure, whereby the bottle is completely sealed except when liquid is being withdrawn by said needle, and a cap of stiff material covering said stopper and securing the same to a bottle, said cap forming a closure for said filter chamber to hold the filter material therein and being provided with air vents through which air may pass to said filter material, said cap having apertures through which said needle may be passed into said impervious material.

3. The invention set forth in claim 1 in which the bottom wall of the filter chamber is provided with an air vent and in which the filter chamber is provided with an internal flange adapted to hold the filter material in spaced relationship to said air vent, whereby said material is prevented from interfering with the operation of said vent.

ROBERT C. PAGE.
PAUL E. TULLAR.